United States Patent
Katsuyama et al.

(10) Patent No.: US 9,635,236 B2
(45) Date of Patent: Apr. 25, 2017

(54) CAMERA BODY, CAMERA SYSTEM, AND METHOD OF CONTROLLING CAMERA-BODY BLUR CORRECTION

(71) Applicant: Panasonic Intellectual Property Management Co., Ltd., Osaka (JP)

(72) Inventors: Norikazu Katsuyama, Osaka (JP); Yusuke Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/639,257

(22) Filed: Mar. 5, 2015

(65) Prior Publication Data

US 2015/0264266 A1 Sep. 17, 2015

(30) Foreign Application Priority Data

Mar. 12, 2014 (JP) .................. 2014-049349
Feb. 26, 2015 (JP) .................. 2015-036516

(51) Int. Cl.
*H04N 5/232* (2006.01)
*G02B 27/64* (2006.01)

(52) U.S. Cl.
CPC ....... *H04N 5/23209* (2013.01); *G02B 27/646* (2013.01); *H04N 5/23251* (2013.01); *H04N 5/23287* (2013.01); *H04N 5/23245* (2013.01)

(58) Field of Classification Search
CPC ........... H04N 5/23209; H04N 5/23251; H04N 5/23287; G02B 27/646

(Continued)

(56) References Cited

U.S. PATENT DOCUMENTS

2009/0180770 A1* 7/2009 Honjo ............... G03B 5/00 396/55
2011/0050921 A1* 3/2011 Noto ............... G03B 5/00 348/208.7

(Continued)

FOREIGN PATENT DOCUMENTS

JP 2006-071743 A 3/2006
JP 2007-025298 A 2/2007

(Continued)

*Primary Examiner* — Nhan T Tran
*Assistant Examiner* — Chan Nguyen
(74) *Attorney, Agent, or Firm* — Renner, Otto, Boisselle & Sklar, LLP

(57) ABSTRACT

A camera body according to the present disclosure is one on which a lens unit is detachably mounted. The lens unit includes an optical system to form an optical image of a subject onto an imaging surface. The camera body includes: an imaging part having the imaging surface to form an image by converting light incident from the optical system into an electric signal; a first blur-detecting part capable of detecting motion of the camera body at least in a pitching, yawing, and rolling directions; a first blur-correction part capable of correcting a blur caused by the motion in the pitching, yawing, and rolling directions, based on a result of the detection by the first blur-detecting part; and a first controller, capable of communicating with the lens unit, controlling both the first blur-detecting part and the first blur-correction part. The first controller acquires information indicating whether or not the lens unit includes a second blur-correction part to correct a blur caused by the motion in the pitching and yawing directions. The first blur-correction part corrects only a blur caused by the motion in the rolling direction when the lens unit causes the second blur-correction part to operate.

10 Claims, 9 Drawing Sheets

(58) Field of Classification Search
USPC .................................................... 348/208.2
See application file for complete search history.

(56) References Cited

U.S. PATENT DOCUMENTS

| | | | |
|---|---|---|---|
| 2011/0122269 A1* | 5/2011 | Zhao | G03B 17/00 348/208.99 |
| 2012/0154613 A1 | 6/2012 | Honjo et al. | |
| 2012/0268642 A1* | 10/2012 | Kawai | G02B 27/646 348/335 |
| 2014/0002679 A1* | 1/2014 | Ikeda | H04N 5/23264 348/208.5 |
| 2014/0049658 A1* | 2/2014 | Yamazaki | H04N 5/23254 348/208.11 |
| 2016/0165111 A1* | 6/2016 | Uemura | G02B 7/08 348/208.11 |

FOREIGN PATENT DOCUMENTS

| | | |
|---|---|---|
| JP | 2009-075221 A | 4/2009 |
| WO | WO 2008/010568 A1 | 1/2008 |

\* cited by examiner

CAMERA BODY, CAMERA SYSTEM, AND METHOD OF CONTROLLING CAMERA-BODY BLUR CORRECTION

BACKGROUND

1. Field

The present disclosure relates to camera bodies having a function of correcting an image blur attributed to a camera shake and the like, camera systems, and methods of controlling the camera bodies and camera systems.

2. Description of the Related Art

Japanese Patent Unexamined Publication No. 2007-25298 discloses a camera system which has functions for blur correction on either an interchangeable lens side or a camera body side, or on the both sides. Such a camera system determines a combination of allowable blur correction functions in accordance with an amount of correction in each of axial directions, and then selects the blur correction functions to be used.

SUMMARY

A camera body according to the present disclosure is one on which a lens unit is detachably mounted. The lens unit includes an optical system to form an optical image of a subject onto an imaging surface. The camera body includes: an imaging part including the imaging surface, and forming an image by converting light incident from the optical system into an electric signal; a first blur-detecting part capable of detecting motion of the camera body at least in a pitching, yawing, and rolling directions; a first blur-correction part capable of correcting a blur caused by the motion in the pitching, yawing, and rolling directions, based on a result of the detection by the first blur-detecting part; and a first controller, capable of communicating with the lens unit, to control the first blur-detecting part and the first blur-correction part. The first controller acquires information indicating whether or not the lens unit includes a second blur-correction part which corrects a blur caused by the motion in the pitching and yawing directions. The first blur-correction part corrects only a blur caused by the motion in the rolling direction when the lens unit causes the second blur-correction part to operate.

With this configuration, the first controller of the camera body acquires the information indicating whether or not the lens unit includes the second blur-correction part which corrects the blur caused by the motion in the pitching and yawing directions. When the information indicates that the lens unit includes the second blur-correction part, the first controller of the camera body corrects only the blur caused by the motion in the rolling direction. This allows the camera body to allocate an enough amount of a blur correction angle for a blur component in the rolling direction, which maximizes an effect of the correction of the blur component in the rolling direction.

Moreover, a camera system according to the present disclosure includes the camera body described above and the lens unit that has the optical system to form an optical image of a subject onto the imaging surface, with the lens unit being detachably mounted on the camera body and capable of communicating with the camera body.

Furthermore, a method of correcting a blur according to the present disclosure is one for correcting a blur of a camera body on which a lens unit is detachably mounted. The lens unit includes an optical system to form an optical image of a subject onto an imaging surface. The camera body includes an imaging part having the imaging surface to form an image by converting light incident from the optical system into an electric signal. The method includes the steps of: acquiring lens information indicating whether or not the lens unit is capable of correcting a blur caused by motion in a pitching and yawing directions; determining whether or not the lens unit is capable of correcting the blur caused by the motion in the pitching and yawing directions based on the information acquired in the step of acquiring the lens information; and correcting, by the camera body, only a blur caused by the motion in the rolling direction when the lens unit is determined, in the step of determining, to be capable of correcting the blur caused by the motion in the pitching and yawing directions.

DETAILED DESCRIPTION

Hereinafter, embodiments will be described in detail, with appropriate reference to the accompanying drawings. It is noted, however, that descriptions in more detail than necessary will sometimes be omitted. For example, detailed descriptions of well-known items and duplicate descriptions of substantially the same configuration will sometimes be omitted, for the sake of brevity of the following descriptions and easy understanding by those skilled in the art.

Note that the accompanying drawings and the following descriptions are provided herein to facilitate fully understanding of the present disclosure by those skilled in the art, and are in no way intended to impose any limitation on the subject matter set forth in the appended claims.

First Exemplary Embodiment

A description will be made regarding digital camera 1 (an example of a camera system) according to an embodiment of the present invention, with reference to FIGS. 1 to 6.

1-1. Configuration

[1-1-1. Configuration of Digital Camera]

Figure 1:
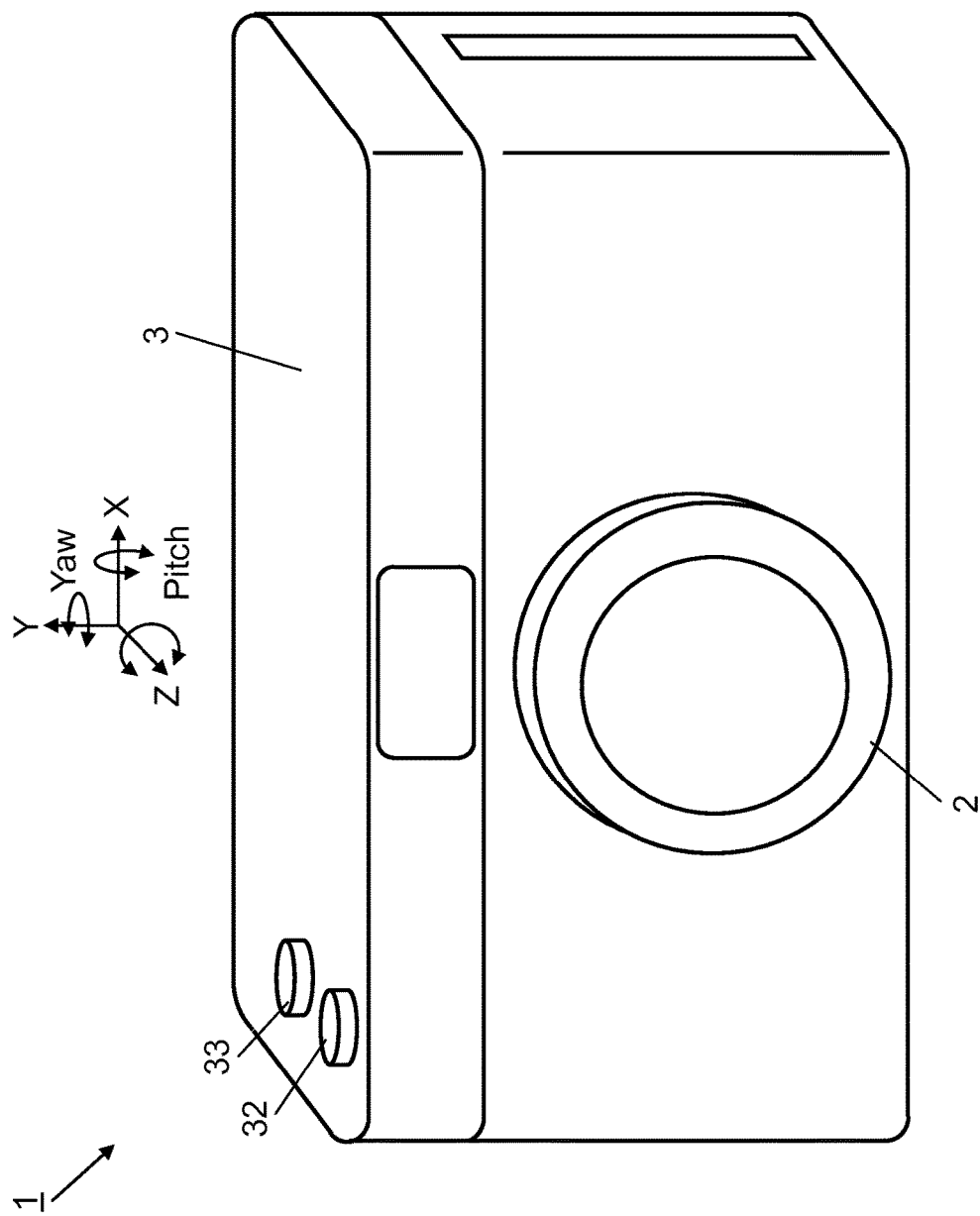
FIG. 1 is an external view of a digital camera.

FIG. 1 is a schematic external view of digital camera 1. Digital camera 1 includes interchangeable lens unit 2 (an example of a lens unit) and camera body 3 (an example of a camera body). Interchangeable lens unit 2 is detachably mounted on camera body 3. An upper part of camera body 3 is equipped with shutter button 32 and power button 33 which are operated by a user.

In the embodiment, a three-dimensional rectangular coordinate system is used as shown in FIG. 1. Specifically, digital camera 1 has a Z-axis direction coinciding with its optical axis, a Y-axis direction coinciding with the vertical direction in a landscape attitude of digital camera 1, and an X-axis coinciding with the horizontal direction in the landscape attitude of digital camera 1. Note that the use of these directions is not intended to limit service conditions of digital camera 1.

The rotation direction around the Z-axis is designated as a rolling direction; the rotation direction around the Y-axis is designated as a yawing direction; and the rotation direction around the X-axis is designated as a pitching direction.

Figure 2:
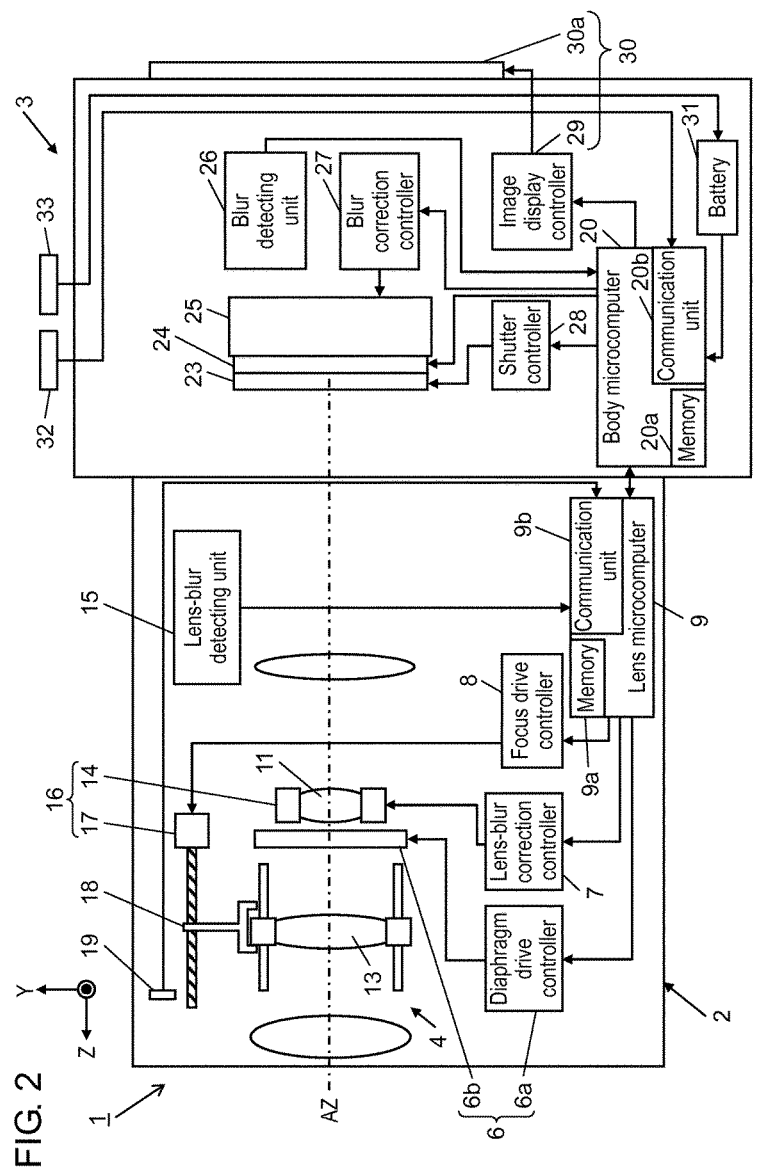
FIG. 2 is a schematic configuration view of the digital camera.

FIG. 2 is a schematic view of an overall configuration of digital camera 1 configured with interchangeable lens unit 2 and camera body 3.

[1-1-2. Interchangeable Lens Unit]

Interchangeable lens unit 2 includes optical system 4 (an example of an optical system) configured with a plurality of lens groups, optical-system drive unit 16 to drive optical system 4, various controllers to control optical-system drive unit 16, and diaphragm controller 6.

Optical system 4 includes blur-correction lens group 11 and focus lens group 13, as shown in FIG. 2. Blur-correction lens group 11 is a lens group used to correct blur components of digital camera 1 occurring when photographing.

Optical-system drive unit 16 includes lens-blur correction mechanism 14 and focus actuator 17 having a leadscrew and rack 18, as shown in FIG. 2.

The various controllers to control optical-system drive unit 16 includes lens-blur correction controller 7, focus drive controller 8, photo sensor 19, and lens-blur detecting unit 15, as shown in FIG. 2.

Diaphragm controller 6 includes diaphragm mechanism 6b and diaphragm drive controller 6a, as shown in FIG. 2.

Interchangeable lens unit 2 further includes lens microcomputer 9 serving as a controller of interchangeable lens unit 2, as shown in FIG. 2. Lens-blur correction mechanism 14 according to the embodiment is attached to blur-correction lens group 11. The lens-blur correction mechanism drives blur-correction lens group 11 to correct at least rotational blur components that include a blur in the pitching direction and a blur in the yawing direction. It is noted, however, that lens-blur correction mechanism 14 included in interchangeable lens unit 2 has no correction function for correcting a blur in the rolling direction, i.e. another rotational blur component.

Lens-blur detecting unit 15 is configured with an angle sensor to detect shakes in the pitching direction, another angle sensor to detect shakes in the yawing direction, an amplifier to amplify a detection signal of each of the angle sensors, an A/D conversion circuit to digitize the thus-amplified detection signal and then to output it to lens microcomputer 9, and the like. Lens-blur detecting unit 15 is coupled with lens microcomputer 9 and detects the rotational blur components described above. Lens microcomputer 9 commands lens-blur correction controller 7 to perform a blur correction, based on the result of the detection.

Lens-blur correction controller 7 is coupled with lens-blur correction mechanism 14. Lens-blur correction controller 7 performs drive control of lens-blur correction mechanism 14, based on the command given by lens microcomputer 9. Lens-blur correction controller 7 and lens-blur correction mechanism 14 configure a blur correction part (an example of a second blur-correction part).

Focus lens group 13 is coupled with focus actuator 17. Rack 18 is attached to a leadscrew which is configured as a one-piece body together with a rotary shaft of focus actuator 17. Through the use of rack 18 attached to the leadscrew, the rotary motion actuated by focus actuator 17 is converted into a rectilinear motion for driving focus lens group 13. With this configuration, focus lens group 13 is driven on optical axis AZ in the Z-direction to change its focal length.

Focus actuator 17 is coupled with focus drive controller 8. Focus drive controller 8 performs control of the rotation of focus actuator 17 based on the command given by lens microcomputer 9.

Photo sensor 19 detects the position of the lens, and then inputs the resulting detection signal to lens microcomputer 9.

(Diaphragm Controller)

Diaphragm mechanism 6b is controlled by diaphragm drive controller 6a. Diaphragm mechanism 6b is such that the opening shape of the diaphragm is changed by driving diaphragm blades (not shown) of the diaphragm in an either opening or closing direction. Such a driving of the diaphragm blades allows changing of the aperture value of optical system 4.

Diaphragm drive controller 6a controls the diaphragm, based on the command given by lens microcomputer 9, such that the aperture diameter of the diaphragm is changed in accordance with a camera-to-subject distance.

(Lens Unit Controller)

Lens microcomputer 9 gives the command to lens-blur correction controller 7, focus drive controller 8, and diaphragm drive controller 6a. Each of the controllers performs the drive control based on the command given by lens microcomputer 9. In addition, lens microcomputer 9 receives signals from shutter button 32 and power button 33, and then gives the command to each of the controllers based on the received signals.

Lens microcomputer 9 includes a CPU (not shown) and memory 9a. The CPU reads programs stored in memory 9a, allowing the CPU to perform various functions. For example, lens microcomputer 9 can determine the absolute position of focus lens group 13 by using the detection signal from photo sensor 19. In addition, lens microcomputer 9 includes communication unit 9b, thereby being capable of transmitting and receiving information to and from body microcomputer 20.

[1-1-3. Camera Body]

Camera body 3 includes body microcomputer 20 serving as a first controller, shutter unit 23, image sensor 24 serving as an imaging part, blur correction mechanism 25, blur detecting unit 26 (an example of a first blur-detecting part), blur correction controller 27, shutter controller 28, image display unit 30, battery 31, shutter button 32, and power button 33. Image display unit 30 includes image display controller 29 and display monitor 30a.

On the back of camera body 3, display monitor 30a is disposed. On the upper surface of camera body 3, shutter button 32 and power button 33 are disposed.

Power button 33 is a switch to turn on and off the power of digital camera 1. Upon turning on the power by using power button 33, every part of digital camera 1 and interchangeable lens unit 2 is energized.

Camera body 3 further includes a mode selection dial (not shown). The mode selection dial is a dial to select an operation mode of digital camera 1, among a still-image photographing mode, a moving-image photographing mode, a reproducing mode, and the like. A user can select the operation mode by turning the mode selection dial. When the still-image photographing mode is selected by turning the mode selection dial, the operation mode is changed to the still-image photographing mode. When the moving-image photographing mode is selected by turning the mode selection dial, the operation mode is changed to the moving-image photographing mode. In the moving-image photographing mode, the user can take moving pictures in principle. Moreover, when the reproducing mode is selected by turning the mode selection dial, the operation mode is changed to the reproducing mode in which display monitor 30a displays photographed images.

Shutter button 32 is operated by the user when photographing. Upon the operation of shutter button 32, a timing signal is output to body microcomputer 20. Shutter button 32 is a two-step switch which allows a half-depressing operation and a full-depressing operation. When the user performs the half-depressing operation, body microcomputer 20 executes photometry processing and range processing. When the user performs the full-depressing operation, after having performed the half-depressing operation, the timing signal is output to body microcomputer 20 and then an image data is acquired by image sensor 24.

(Image Sensor)

Image sensor 24 is a sensor, e.g. a charge coupled device (CCD) sensor, which converts an optical image formed by optical system 4 into an electrical signal. Image sensor 24 is subjected to drive control based on a timing signal. Note that image sensor 24 may be a complementary metal oxide semiconductor (CMOS) sensor.

(Shutter Controller)

Shutter controller 28 causes shutter unit 23 to operate, in accordance with the control signal output from body microcomputer 20 that has received the timing signal.

Note that an automatic focusing system in the embodiment employs a contrast detection system in which an image data formed by image sensor 24 is used. The use of the contrast detection system allows a high-precision focus adjustment.

(Blur Detecting Part and Blur Correction Part)

Blur correction mechanism 25 movably supports image sensor 24 and includes a plurality of actuators such as a voice coil motor which corrects the blur components occurring when photographing. Blur correction controller 27 is coupled with blur correction mechanism 25 and drives blur correction mechanism 25 so as to suppress the blur components in camera body 3 which are detected by blur detecting unit 26. That is, the blur is corrected by rotating and translating image sensor 24 in accordance with the blur in camera body 3 detected by blur detecting unit 26, in the following manner: Image sensor 24 is rotated in the three rotation directions, i.e. the pitching (Pitch), yawing (Yaw), and rolling (Roll) directions, around the respective axes of the three-dimensional rectangular coordinate system which is used for digital camera 1 of FIG. 1. In addition, image sensor 24 is translated parallel to the blur occurring in the X-direction, Y-direction, and Z-direction along the respective axes of the three-dimensional rectangular coordinate system. Blur correction mechanism 25 and blur correction controller 27 configure a blur correction part (an example of a first blur-correction part).

Here, the blur components occurring in digital camera 1 will be described. In digital camera 1, the blur components occur due to a camera shake (vibration) which occurs when a user takes a photograph with the camera being held by user's hands. The blur components include rotational blur components and translational blur components. The rotational blur components occur around the respective axes of the three-dimensional rectangular coordinate system which is used for digital camera 1 of FIG. 1. The translational blur components occur in the respective axial directions of the three-dimensional rectangular coordinate system. The rotational blur components occurring around the respective axes of the three-dimensional rectangular coordinate system, include a pitching component (Pitch), a yawing component (Yaw), and rolling component (Roll). The translational blur components occurring in the respective axial directions of the three-dimensional rectangular coordinate system, include an X-shift component, a Y-shift component, and a Z-shift component. Therefore, the blur includes the six components. The blur correction mechanism commonly performs the correction of any of the components excluding the Z-shift component. Blur correction mechanism 25 according to the embodiment is capable of correcting at least rotational blur components that includes the pitching component, the yawing component, and the rolling component.

(Body Microcomputer)

Body microcomputer 20 includes communication unit 20b and is coupled with lens microcomputer 9 via an interface, thereby communicating with lens microcomputer 9.

Body microcomputer 20 is a control device to control the whole of camera body 3. Body microcomputer 20 controls each part of digital camera 1, in accordance with operation information inputted by a user. Specifically, body microcomputer 20 is equipped with a CPU and memory 20a such as ROM and RAM. The CPU reads programs stored in the ROM, allowing the CPU to perform various functions.

Figure 3:
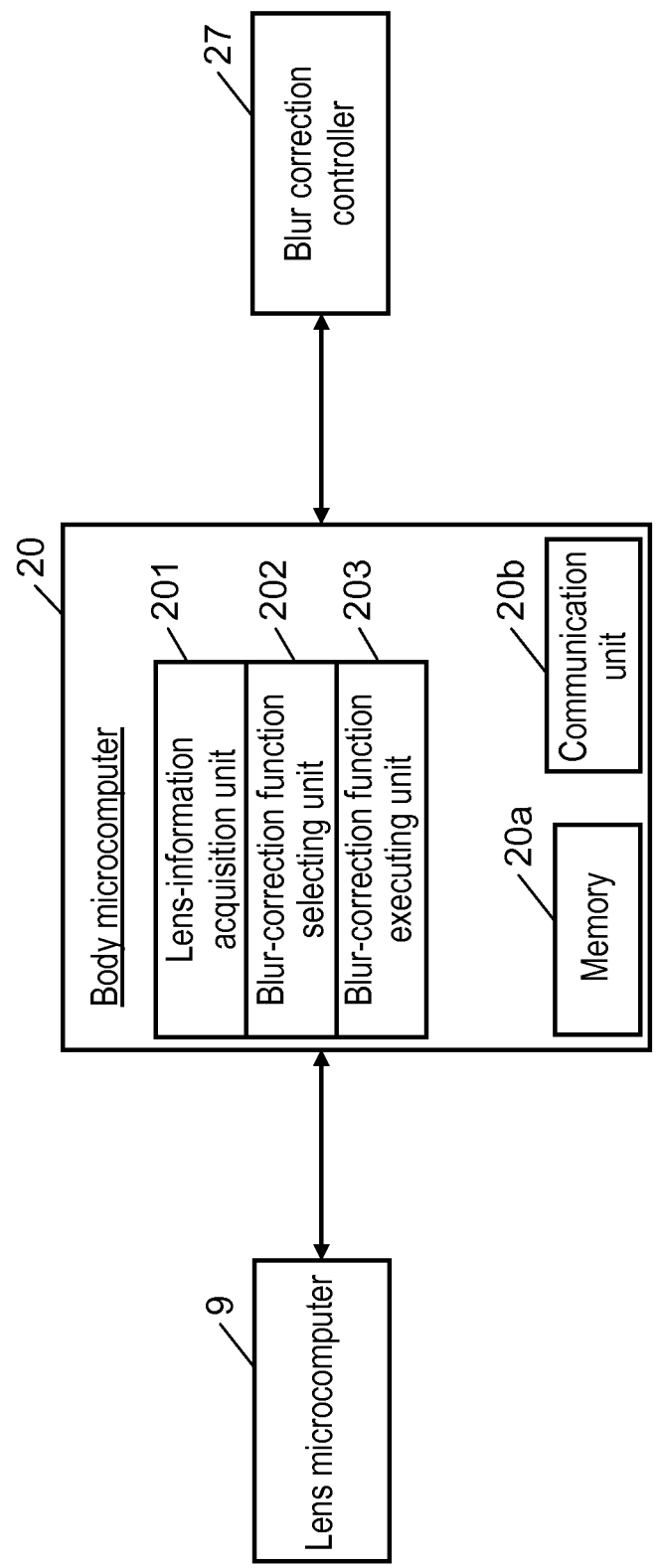
FIG. 3 is a functional block diagram of a body microcomputer of a camera body according to a first embodiment.

Specifically, as shown in FIG. 3, body microcomputer 20 includes lens-information acquisition unit 201, blur-correction function selecting unit 202, and blur-correction function executing unit 203, thereby performing the respective functions.

Lens-information acquisition unit 201 acquires lens information from lens microcomputer 9 through the communication between body microcomputer 20 and lens microcomputer 9. The lens information includes, for example, a type of interchangeable lens unit 2 and information of a blur correction function installed in interchangeable lens unit 2. Body microcomputer 20 stores, into memory 20a, the information of the blur correction function of interchangeable lens unit 2 (existence or non-existence of the blur correction function and a kind of the blur correction function).

Blur-correction function selecting unit 202 determines whether or not mounted interchangeable lens unit 2 has a blur correction function, from the lens information acquired from information acquisition unit 201. Then, based on the resulting judgment, the selecting unit selects the blur detection and correction to be performed on the camera body 3 side. Specifically, when interchangeable lens unit 2 is determined to have the blur correction function, the blur-correction function selecting unit selects the detection and correction such that only the rolling component is detected and corrected on the camera body 3 side and that the pitching and yawing components are detected and corrected on the interchangeable lens unit 2 side. On the other hand, when interchangeable lens unit 2 is determined not to have the blur correction function, the blur-correction function selecting unit selects the detection and correction such that the rolling, pitching, and yawing components are detected and corrected on the camera body 3 side.

Blur-correction function executing unit 203 performs the blur detection and correction selected by blur-correction function selecting unit 202. Moreover, when the blur correction function is set on the lens side, blur-correction function executing unit 203 commands lens microcomputer 9 to detect and correct the pitching and yawing components. Moreover, blur-correction function executing unit 203 determines whether or not the blur correction function has been activated by user's setting. When the blur correction function is determined to have been activated, the executing unit performs the blur correction function on the camera body 3 side, or alternatively on both the camera body 3 side and the interchangeable lens unit 2 side.

(Image Display Unit)

Image display unit 30 is configured with display monitor 30a and image display controller 29. Display monitor 30a is a liquid crystal display monitor, for example. Display monitor 30a displays a photographed image, based on a command given by image display controller 29. Display modes of display monitor 30a include a display mode in which only the image signal is displayed as a visible image and another display mode in which both the image signal and information of photographing are displayed as a visible image.

(Battery)

Battery 31 supplies power to every part of camera body 3 and to interchangeable lens unit 2. In the embodiment, battery 31 is a rechargeable battery. Note that battery 31 may be a dry cell or an external power source to which the power is supplied from the outside via a line cord.

1-2. Operation

Hereinafter, a description will be made regarding operations of camera body 3 of digital camera 1 according to the embodiment, focusing particularly on the blur correction function.

[1-2-1. Selection and Judgment of Blur Correction Function]

Figure 4:
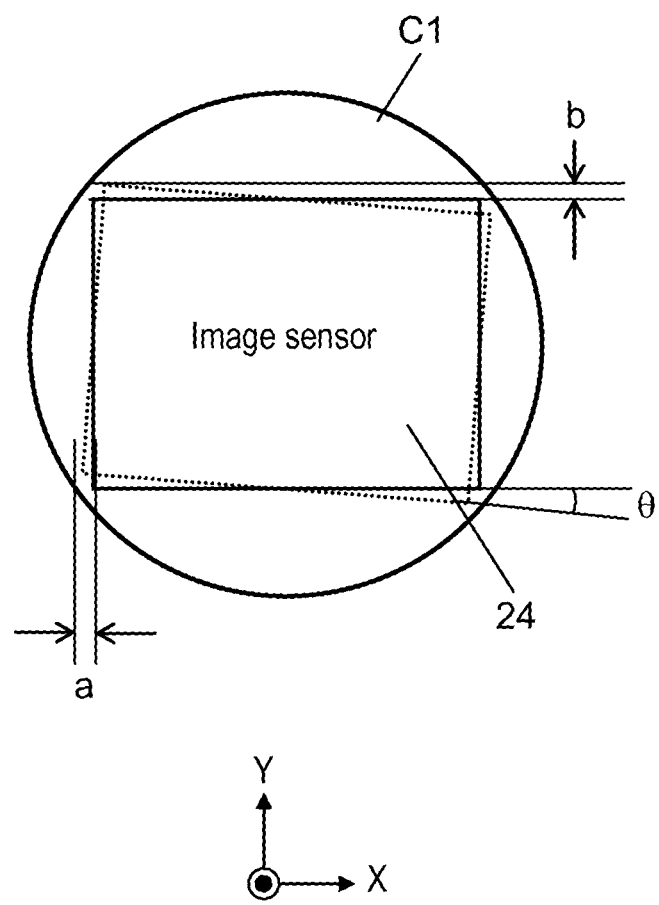
FIG. 4 is a view illustrating a relation between a range of allowable movement of an image sensor and a rolling component correction.

FIG. 4 is a view illustrating a relation, involved in the blur correction, between an image sensor and an image circle.

Image circle C1 is a circular range in which light having passed through a lens forms an optical image. On the outside of the range, optical performance of the lens is not guaranteed. For this reason, blur correction mechanism 25 of camera body 3 is required to drive image sensor 24 within the range of image circle C1, in correcting the blur components.

When blur correction mechanism 25 moves image sensor 24 within image circle C1 shown in FIG. 4, the range of the allowable movement is limited to within allowable movement ranges "a" and "b" in the X- and Y-directions, respectively. In the case where the center of rotation of image sensor 24 coincides substantially with the center of image circle C1 as indicated by a solid line in FIG. 4, when blur correction mechanism 25 rotates image sensor 24 so as to correct the rolling component of the blur, the mechanism can rotate image sensor 24 until at rotation angle θ shown in the figure. Unfortunately, the allowable angle of rotation of image sensor 24 decreases with increasing distance of the center of rotation of image sensor 24 away from the center of image circle C1. The use of blur correction mechanism 25 to correct the blur components other than the rolling component results in the movement of image sensor 24 in the X- and Y-directions. This means that image sensor 24 is not always located in the center portion of image circle C1, which results in a decrease in blur correction angle θ in the rolling direction.

Figure 5:
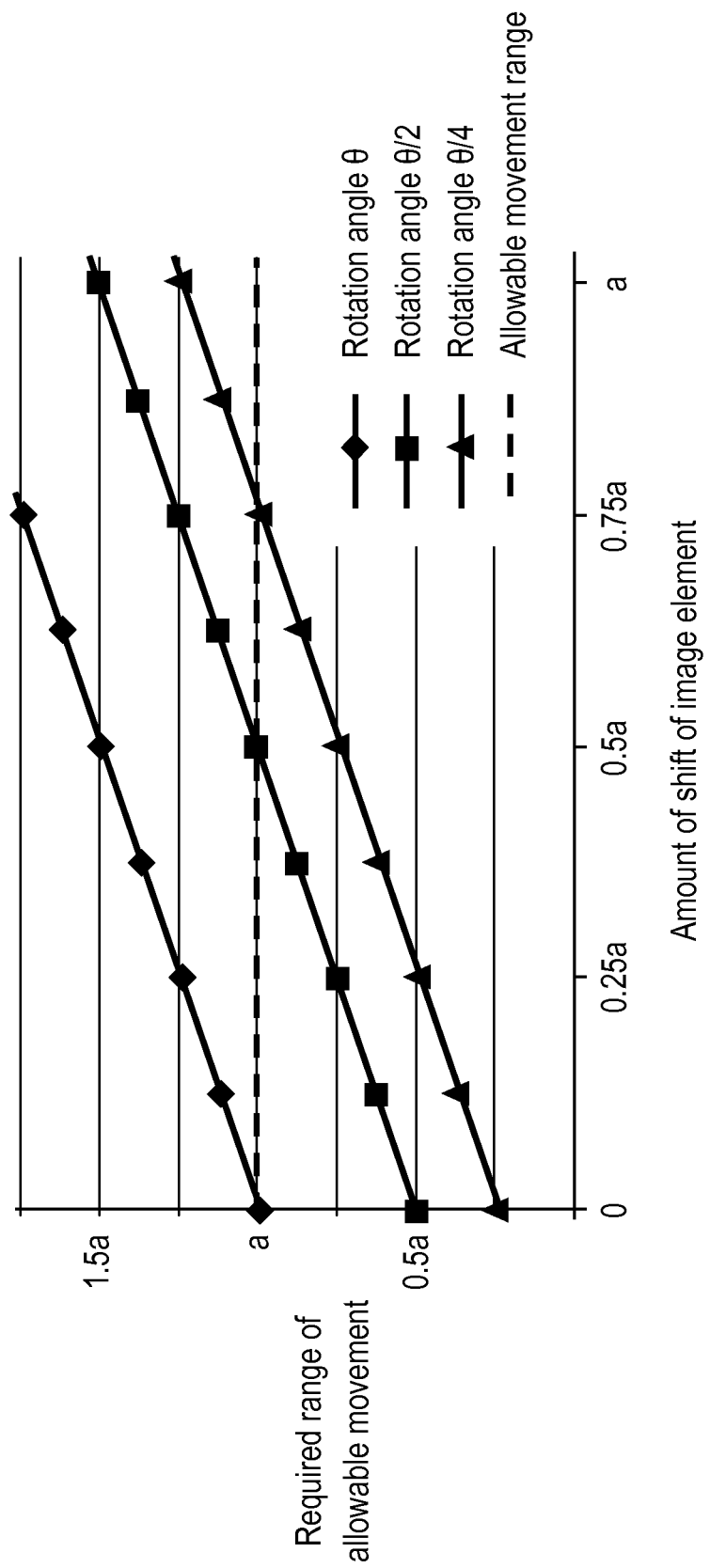
FIG. 5 is a graph illustrating a relation between a rotation angle of the image sensor and a required range of the allowable movement.

FIG. 5 shows a relation between rotation angle θ and required allowable movement range "a," in the case where the center of rotation of image sensor 24 is out of the center of image circle C1 in the X-direction. As can be seen from FIG. 5, when required allowable movement range "a" is set to be larger, the allowable rotation becomes greater. However, such a larger "a" requires a proportionately larger size of blur correction mechanism 25 in the camera body 3. In addition, this poses a problem that an edge portion of image sensor 24 exits from the image circle.

Note that, in photographing a still image, the problem described above is not so serious for the rolling component among the blur components. This is because required exposure time is so short that such a rolling component can be corrected by rotating the image sensor commonly at only about ±0.5 degree. However, in photographing a moving image, the rolling correction of about ±3 degrees is required because of a longer period of time of the photographing, when assuming that the photographing is made while walking. For this reason, blur correction angle θ for the rolling component should be set as large as possible. Therefore, the correction in the pitching and yawing directions which is performed by shifting image sensor 24 in the X- and Y-directions is performed preferably not on body 3 side as much as possible. In the embodiment, the problem described above is overcome in such a manner: That is, the correction of the pitching and yawing components which is made by shifting image sensor 24 is performed preferably on the lens 2 side as much as possible, thereby allowing largest possible blur correction angle θ in the rolling direction at which the rolling correction is performed by blur correction mechanism 25 on the camera body 3 side.

[1-2-2. Operation of Selection of Blur-Correction Function]

Figure 6:
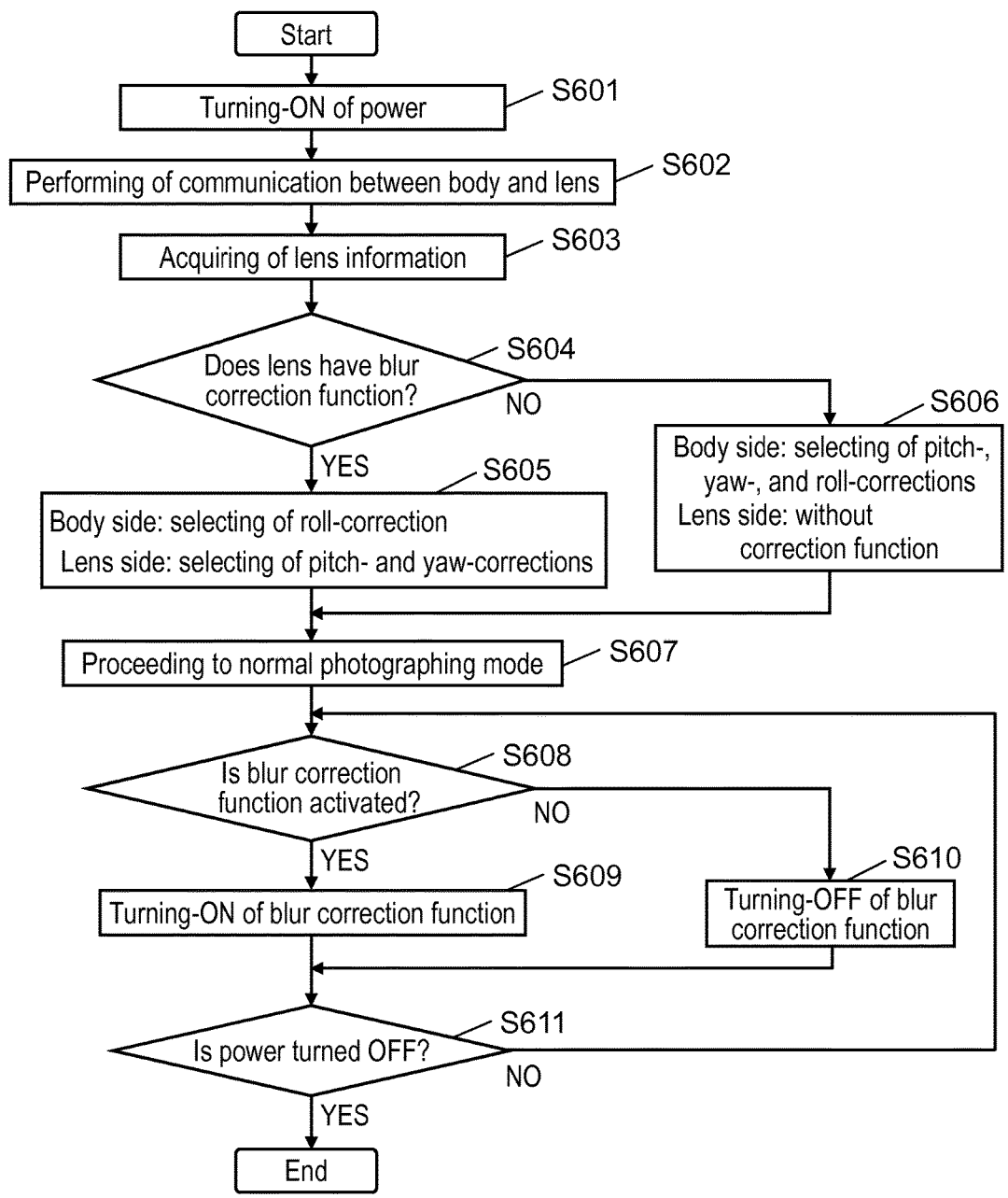
FIG. 6 is a flowchart illustrating control processing performed by the body microcomputer of the camera body according to the first embodiment.

FIG. 6 shows the process of operation of selecting the blur-correction function which is performed mainly by body microcomputer 20 of camera body 3.

S601: Responding to the operation of power button 33 by a user, battery 31 begins supplying power to body microcomputer 20 to start.

S602: Body microcomputer 20 detects the mounting of interchangeable lens unit 2 and then begins communicating with lens microcomputer 9 of interchangeable lens unit 2 mounted on camera body 3, thereby starting an initial setting.

S603: Upon starting the initial setting, lens-information acquisition unit 201 of body microcomputer 20 acquires lens information from lens microcomputer 9. The lens information includes, for example, a type of interchangeable lens unit 2 and information of the blur correction function installed in interchangeable lens unit 2. Lens-information acquisition unit 201 stores, into memory 20a, the thus-acquired information of the blur correction function of interchangeable lens unit 2 (existence or non-existence of the blur correction function and a kind of the blur correction function).

S604: Blur-correction function selecting unit 202 of body microcomputer 20 determines whether or not mounted interchangeable lens unit 2 has the blur correction function, from the lens information acquired by lens-information acquisition unit 201. When interchangeable lens unit 2 is determined to have the blur correction function, the process proceeds to Step S605. When interchangeable lens unit 2 is determined not to have the blur correction function, the process proceeds to Step S606.

S605: Blur-correction function selecting unit 202 selects the correction such that only the rolling component is corrected on the camera body 3 side and the pitching and yawing components are corrected on the interchangeable lens unit 2. In accordance with the selection, blur-correction function selecting unit 202 makes a setting for blur correction controller 27 to correct the blur component in the rolling direction detected by blur detecting unit 26 in the inside of camera body 3. On the other hand, blur-correction function selecting unit 202 commands lens microcomputer 9 on the interchangeable lens unit 2 side to perform the correction of the blur components in the pitching and yawing directions detected by lens-blur detecting unit 15.

S606: Blur-correction function selecting unit 202 recognizes that the interchangeable lens unit 2 side does not have the correction function, and makes a setting to correct the blur components in the rolling, pitching, and yawing directions detected on the camera body 3 side.

S607: The selection and setting of the blur correction function are finished, which completes the initial setting. Then, body microcomputer 20 proceeds into a normal photographing mode.

S608: In the normal photographing mode, blur-correction function executing unit 203 of body microcomputer 20 determines whether or not the blur correction function has been activated by user's setting. For example, the user can set the blur correction function to be either active or inactive, through an operation of the setting selected from menu buttons (omitted in the figures). Blur-correction function executing unit 203 proceeds to Step S609 when the blur correction function is ON, whereas proceeds to Step S610 when the blur correction function is OFF.

S609: Blur-correction function executing unit 203 turns ON the blur correction function, thereby making the blur correction function ready for operation. In this case, the blur component in the rolling direction is corrected by blur correction controller 27 and blur correction mechanism 25, on the camera body 3 side, whereas the blur components in the pitching and yawing directions are corrected by lens-blur correction controller 7 and lens-blur correction mechanism 14, on the interchangeable lens unit 2 side.

S610: Blur-correction function executing unit 203 turns OFF the blur correction function, causing the blur correction function to be inactivated. In this case, the blur correction is performed neither on the body side nor on the lens side.

S611: When receiving a power-OFF command (for example, a case where the user performs OFF-operation of power button 33, a case where automatic power-OFF is performed, or the like), body microcomputer 20 turns the power OFF to terminate the process. Unless the power is turned OFF, body microcomputer 20 continues to repeat Steps S608 to S610.

1-3. Advantages and Others

In the embodiment, camera body 3 includes blur detecting unit 26, blur correction mechanism 25, and body microcomputer 20. Blur detecting unit 26 is capable of detecting the motion at least in the pitching, yawing, and rolling directions. Blur correction mechanism 25 is capable of correcting the blur caused by the motion in the pitching, yawing, and rolling directions based on the result of the detection by blur detecting unit 26. Body microcomputer 20 is capable of communicating with interchangeable lens unit 2 and controls both blur detecting unit 26 and blur correction mechanism 25. Body microcomputer 20 acquires the information that indicates whether or not interchangeable lens unit 2 corrects the blur caused by the motion in the pitching and yawing directions. When interchangeable lens unit 2 corrects the blur caused by the motion in the pitching and yawing directions, blur correction mechanism 25 corrects only the blur caused by the motion in the rolling direction.

Therefore, on the camera body side, an enough amount of the blur correction angle can be set for the blur component in the rolling direction, which maximizes the effect of the correction of the blur component in the rolling direction.

1-4. Modified Examples

1

In the embodiment described above, in order to allocate largest possible blur correction angle θ in the rolling direction, the pitching and yawing components are not corrected on the camera body side. In addition, it is also possible to control the operation such that the blur correction in the translation directions (the correction of the translational blur components occurring in the axial directions of the three-dimensional rectangular coordinate system) is not performed on the camera body 3 side and is performed on the interchangeable lens unit 2 side.

In this case, blur-correction function selecting unit 202 of body microcomputer 20 of camera body 3 determines whether or not the interchangeable lens unit 2 side has the blur correction function in the translation directions (for example, the judgment is made in Step S604 of FIG. 6). When determining that the interchangeable lens unit 2 side has the blur correction function in the translation directions, blur-correction function selecting unit 202 selects the correction function such that the interchangeable lens unit 2 side performs the correction of the blur components in the translation directions as well as the correction of the blur components in the pitching and yawing directions. Moreover, blur-correction function executing unit 203 commands lens microcomputer 9 to perform the correction of the blur components in the translation directions.

Note that, when the interchangeable lens unit 2 side does not have the blur correction function in the translation directions, blur-correction function executing unit 203 may acquire the information of the blur detection in the translation directions detected by blur detecting unit 26 on the camera body 3 side, and transmits the acquired blur detection information to lens microcomputer 9. Then, lens microcomputer 9 may perform the correction of the blur components in the translation directions by using lens-blur correction controller 7.

2

In the embodiment described above, for the correction of the blur components in the translation directions on the camera body 3 side, the determination whether or not the blur components in the translation directions are corrected on the camera body 3 side may be made after having determined whether or not the correction is necessary.

The correction of the blur components in the translation directions by using camera body 3 requires the movement of image sensor 24 in the X- and Y-directions to correct the blur components, as shown in FIG. 4. This leads to a possibility that blur correction angle θ necessary for correcting the blur component in the rolling direction cannot be obtained, depending on the amount of the movement. For this reason, the amount of the correction of the blur components in the translation directions by using camera body 3 is restricted to a required minimum.

Specifically, the blur components in the translation directions have an influence mainly in macro photographing (close-up photographing); however, the blur components in the translation directions have a less influence in photographing other than the macro photographing. Therefore, in the case of the photographing other than the macro photographing, a high priority can be given to the allocation of the blur correction angle for the blur component in the rolling direction, by turning OFF the correction function for the blur components in the translation directions. Note that digital camera 1 determines that the ongoing photographing is in a macro photographing mode when the camera-to-subject distance is short.

Figure 7:
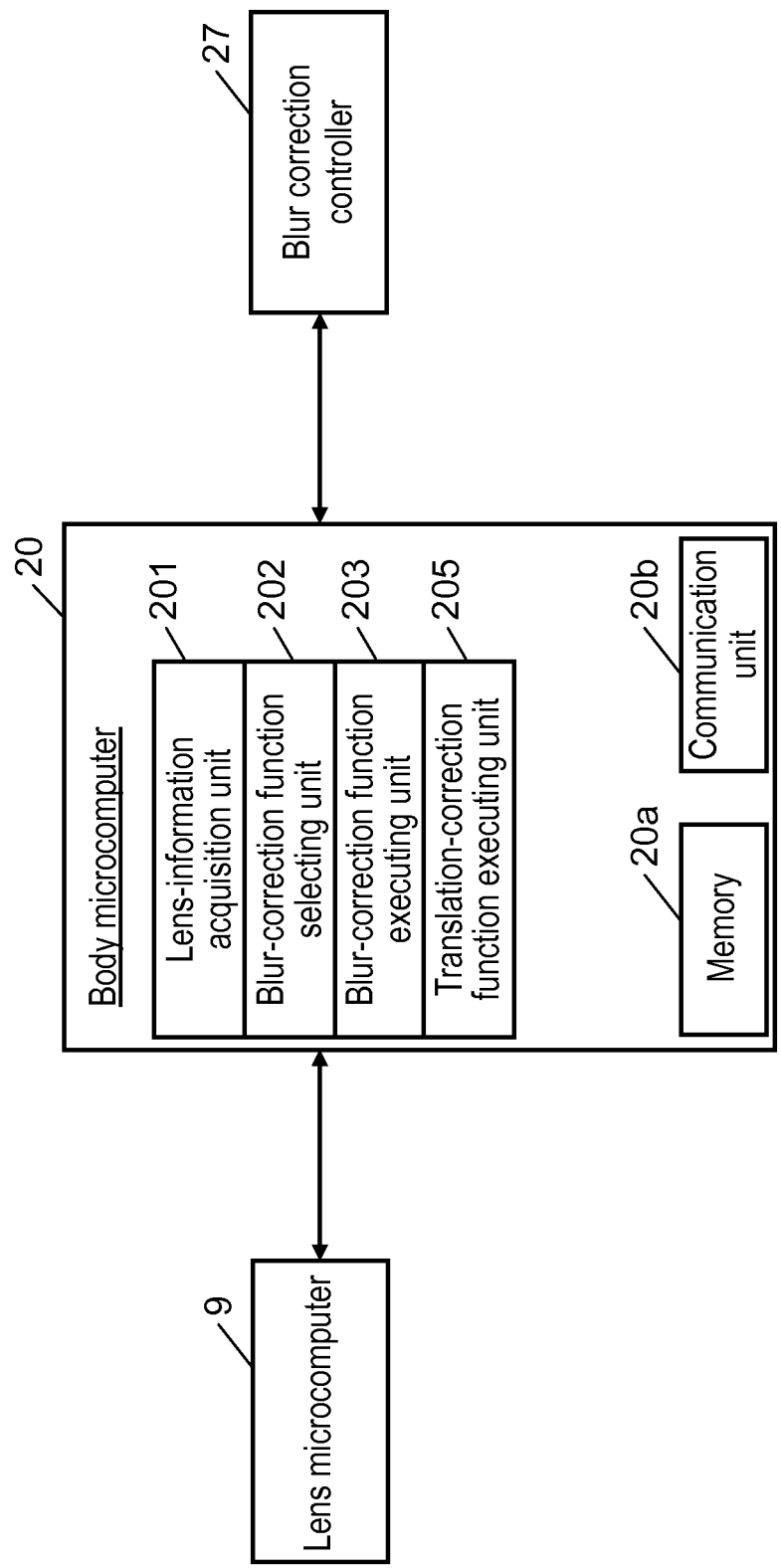
FIG. 7 is a functional block diagram of a body microcomputer of a camera body according to a modified example of the embodiment.

In this case, body microcomputer 20 of camera body 3 performs the function of translation-correction function executing unit 205 as well as the functions of lens-information acquisition unit 201, blur-correction function selecting unit 202, and blur-correction function executing unit 203, as shown in FIG. 7. Translation-correction function executing unit 205 acquires positional information of focus lens group 13 via lens microcomputer 9 of lens 2. By using the positional information, the translation-correction function executing unit turns either ON or OFF the correction function for the translation components, depending on the position of focus lens group 13 (i.e., depending on whether the camera-to-subject distance is short or long) (For example, when the camera-to-subject distance is equal to a threshold value or less, the unit turns ON the correction function.). Note that translation-correction function executing unit 205 may turn ON the correction function for the translation components when the macro mode has been selected.

As described above, in the case of the photographing other than the macro photographing, because the correction function for the blur components in the translation directions is turned OFF, the allocation of the correction angle for the correction of the blur component in the rolling direction can be secured. As a result, the influence of the blur component in the rolling direction on the photographed image can be suppressed, with the influence of the blur components in the translation directions on the image being suppressed to a minimum.

Second Exemplary Embodiment

The configuration according to a second embodiment is different from that according to the first embodiment in that: That is, consider the case where the interchangeable lens unit 2 side has the blur correction function. Even in this case, the blur correction function on the camera body side is selected for the blur component in the rolling direction only when photographing a moving image which is subjected to a great influence of the blur component in the rolling direction. In contrast, any of the blur correction function on the camera body 3 side and the blur correction function on interchangeable lens unit 2 side is selected when photographing a still image which is subjected to a less influence of the blur component in the rolling direction.

[2-1. Configuration]

Since the configuration of a camera system according to the embodiment is the same as that of digital camera 1 according to the first embodiment, descriptions thereof are omitted and the same drawings and the same reference numerals and symbols are used.

Figure 8:
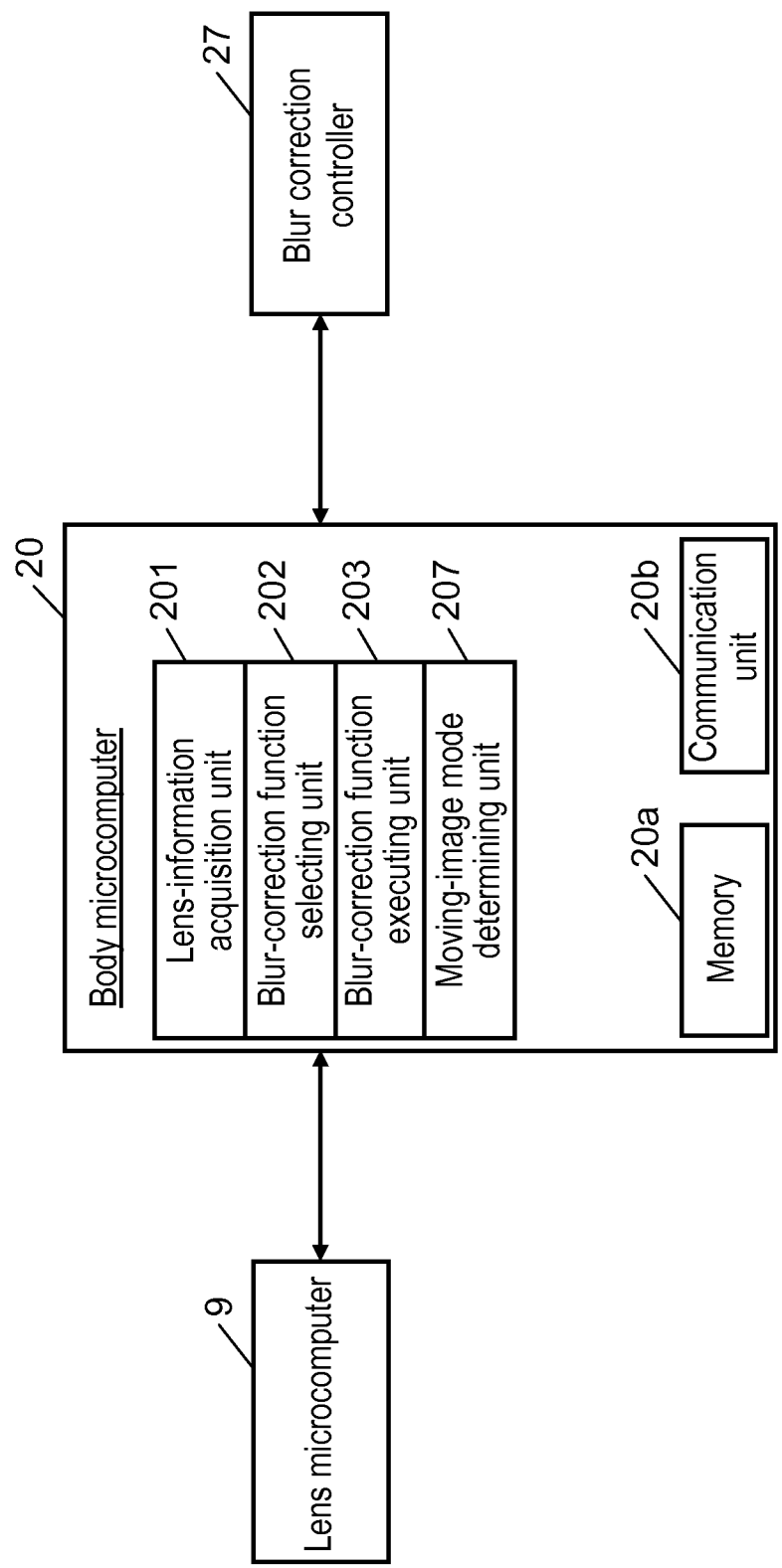
FIG. 8 is a functional block diagram of a body microcomputer of a camera body according to a second embodiment.

In the embodiment, body microcomputer 20 of camera body 3 performs the function of moving-image mode determining unit 207 as well as those of lens-information acquisition unit 201, blur-correction function selecting unit 202, and blur-correction function executing unit 203, as shown in FIG. 8. Before deciding whether or not to select the blur correction function on the interchangeable lens unit 2 side, moving-image mode determining unit 207 determines whether or not digital camera 1 is in a moving image mode. Then, based on the judgment, blur-correction function selecting unit 202 makes a decision whether or not to select the blur correction function.

[2-2. Operation]

Figure 9:
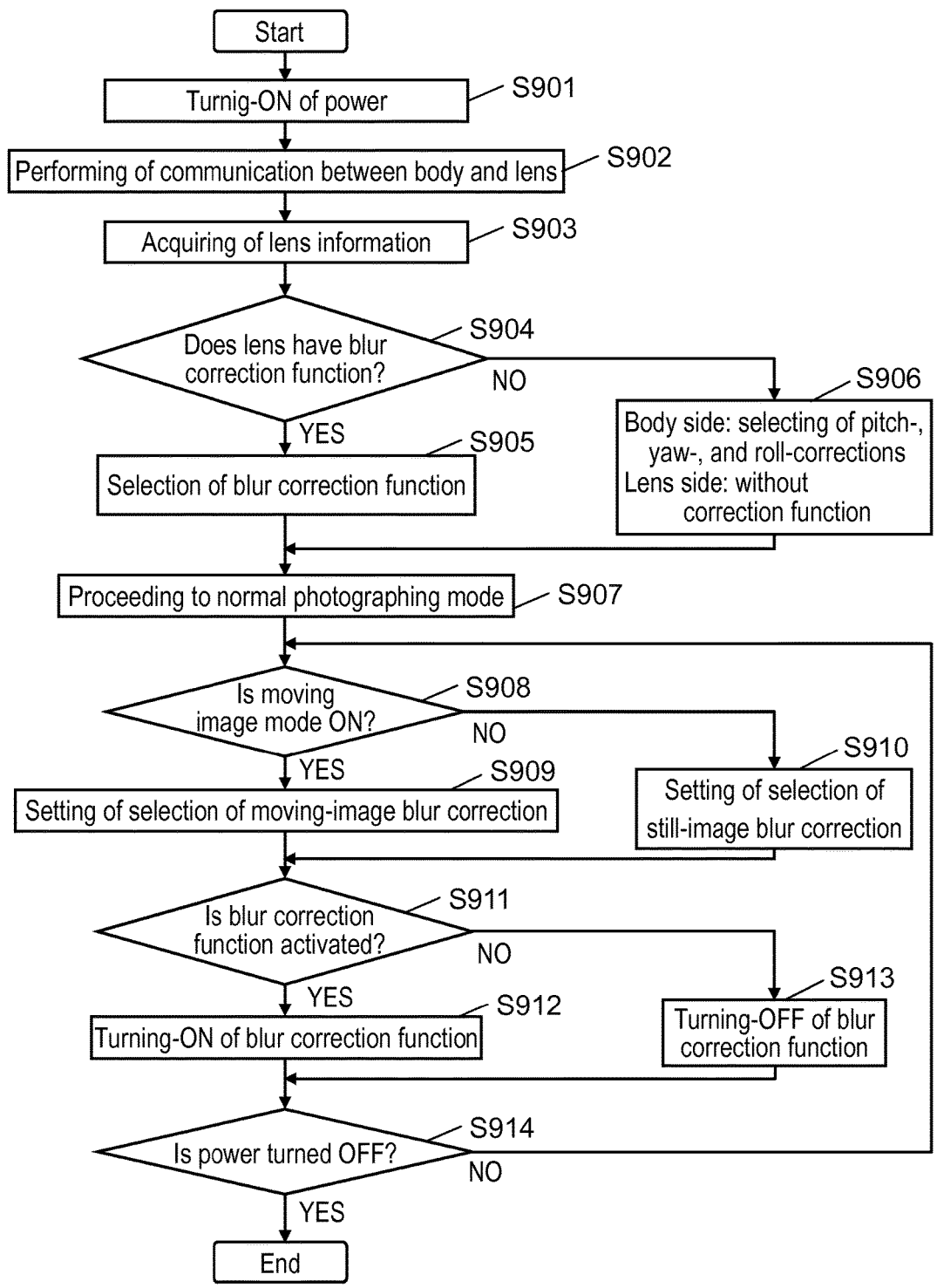
FIG. 9 is a flowchart illustrating control processing performed by the body microcomputer of the camera body according to the second embodiment.

FIG. 9 shows the process of operation of selecting the blur-correction function, which is performed mainly by body microcomputer 20 of camera body 3.

S901: Responding to the operation of power button 33 by a user, battery 31 begins supplying power to body microcomputer 20 to start.

S902: Body microcomputer 20 detects the mounting of interchangeable lens unit 2 and then begins communicating with lens microcomputer 9 of interchangeable lens unit 2 mounted on camera body 3, thereby starting an initial setting.

S903: Upon starting the initial setting, lens-information acquisition unit 201 of body microcomputer 20 acquires lens information from lens microcomputer 9. The lens information includes, for example, a type of interchangeable lens unit 2 and information of the blur correction function installed in interchangeable lens unit 2. Lens-information acquisition unit 201 stores, into memory 20a, the thus-acquired information of the blur correction function of interchangeable lens unit 2 (existence or non-existence of the blur correction function and a kind of the blur correction function).

S904: Blur-correction function selecting unit 202 of body microcomputer 20 determines whether or not the mounted interchangeable lens unit has the blur correction function, from the lens information acquired by lens-information acquisition unit 201. When interchangeable lens unit 2 is determined to have the blur correction function, the process proceeds to Step S905. When interchangeable lens unit 2 is determined not to have the blur correction function, the process proceeds to Step S906.

S905: Blur-correction function selecting unit 202 selects the blur correction function depending on the mode, i.e. either the still image mode or the moving image mode. Specifically, in the moving image mode, blur-correction function selecting unit 202 selects the correction such that the blur component in the rolling direction is corrected on the camera body 3 side, whereas the blur components in the pitching and yawing directions are corrected on the interchangeable lens unit 2 side. On the other hand, in the still image mode, the selecting unit selects the correction function such that any of the blur correction function on the camera body 3 side and the blur correction function the interchangeable lens unit 2 side is used. Such a selection of any of these blur correction functions may be made in advance, or alternatively may be made by an input operation by the user. Alternatively, the selection of the blur correction function may also be made in accordance with the amount of the correction determined based on the result of the blur detection.

S906: Blur-correction function selecting unit 202 recognizes that the interchangeable lens unit 2 side does not have the correction function, and makes a setting such that the blur components in the rolling, pitching, and yawing directions are corrected on the camera body 3 side.

S907: The selection and setting of the blur correction function are finished, which completes the initial setting. Then, body microcomputer 20 proceeds into a normal photographing mode.

S908: In the normal photographing mode, moving-image mode determining unit 207 determines whether or not the moving image mode has been turned ON. Note that, when a moving-image photographing button is set separately and the user turns ON the button to select the moving image mode, the user's operation is given a high priority over the mode selection even when the still image mode has already been selected. Therefore, in this case as well, the judgment may be such that the moving image mode has been turned ON.

The process proceeds to Step S909 when the operation mode is ON, whereas the process proceeds to Step S910 when the operation mode is OFF, S909: Blur-correction function selecting unit 202 selects the blur correction function in accordance with the moving image mode that has been set initially in Step S905.

S910: Blur-correction function selecting unit 202 selects the blur correction function in accordance with the still image mode that has been set initially in Step S905.

S911: Blur-correction function executing unit 203 of body microcomputer 20 determines whether or not the blur correction function has been activated by the user. For example, the user sets the blur correction function to be either active or inactive, by operating a button selected from menu buttons (omitted in the figures). Blur-correction function executing unit 203 proceeds to Step S912 when the blur correction function is ON, whereas proceeds to Step S913 when the blur correction function is OFF.

S912: Blur-correction function executing unit 203 turns ON the blur correction function to make the blur correction function ready for operation. When the process is in the moving image mode, the blur component in the rolling direction is corrected by both blur correction controller 27 and blur correction mechanism 25 on the camera body 3 side, whereas the blur components in the pitching and yawing directions are corrected by both lens-blur correction controller 7 and lens-blur correction mechanism 14 on the interchangeable lens unit 2 side. When the process is in the still image mode, any of the blur correction functions is performed.

S913: Blur-correction function executing unit 203 turns OFF the blur correction function to inactivate the blur correction function. In this case, the blur correction function is performed on neither the body side nor the lens side.

S914: When receiving a power-OFF command (for example, a case where the user performs OFF-operation of power button 33, a case where automatic power-OFF is performed, or the like), body microcomputer 20 turns OFF the power to terminate the process. Unless the power is turned OFF, body microcomputer 20 continues to repeat Steps S908 to S913.

[2-3. Advantages and Others]

In the embodiment, even in the case where the interchangeable lens unit 2 side has the blur correction function, the blur correction function on the camera body 3 side is selected for the blur component in the rolling direction only when photographing a moving image which is subjected to a great influence of the blur component in the rolling direction. On the other hand, any of the blur correction function on the camera body 3 side and the blur correction function on interchangeable lens unit 2 side is selected when photographing a still image which is subjected to a less influence.

This makes it possible to maximize the effect of the correction of the blur component in the rolling direction.

Other Exemplary Embodiments

As described above, the first and second embodiments have been described to exemplify the technology disclosed in the present application. However, the technology is not limited to these embodiments, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first and second embodiments described above.

For example, in the embodiments, even when the blur correction function (in the yawing and pitching directions) is selected on the interchangeable lens unit 2 side, the information of the blur detection may be acquired from the camera body side 3. In this case, blur-correction function executing unit 203 (FIG. 3) of body microcomputer 20 of camera body 3 may acquire the information of the blur detection in the yawing and pitching directions and then transmit the acquired information to lens microcomputer 9. Then, based on the information of the blur detection, the correction of the components may be performed on the interchangeable lens unit 2 side.

Each of the processes in the embodiments may be performed by either hardware or software. Alternatively, each of the processes may be performed via a mixed processing by both hardware and software.

Moreover, the process sequence in which the processes in the embodiments described above are performed is not limited to the aforementioned descriptions of the embodiments, and may be subjected to various changes of the sequence without departing from the gist of the invention.

The technology according to the present disclosure is applicable to camera bodies and camera systems which have the blur correction function.

What is claimed is:

1. A camera body on which a lens unit having an optical system is detachably mounted, the optical system forming an optical image of a subject onto an imaging surface, the camera body comprising:

an imaging part including the imaging surface, and forming an image by converting light incident from the optical system into an electric signal;

a first blur-detecting part capable of detecting motion of the camera body at least in a pitching, yawing, and rolling directions;

a first blur-correction part including an actuator capable of correcting a blur caused by the motion in the pitching, yawing, and rolling directions, based on a result of the detecting by the first blur-detecting part; and a first controller, capable of communicating with the lens unit, for controlling the first blur-detecting part and the first blur-correction part, wherein the first controller acquires information indicating whether or not the lens unit includes a second blur-correction part to correct a blur, by moving a lens group, caused by the motion in the pitching and yawing directions; and, when the lens unit causes the second blur-correction part to operate, the first blur-correction part moves the imaging part by the actuator to correct only a blur caused by the motion in the rolling direction.

2. The camera body according to claim 1,
wherein the first controller determines whether or not the camera body is in a moving-image photographing state; and,
when the camera body is determined to be in the moving-image photographing state, the first blur-correction part corrects only the blur caused by the motion in the rolling direction.

3. The camera body according to claim 1, wherein, when the first blur-correction part corrects only the blur caused by the motion in the rolling direction, the first controller commands the lens unit to correct the blur caused by the motion in the pitching and yawing directions.

4. The camera body according to claim 1,
wherein the first blur-correction part is further capable of correcting a blur caused by motion in a translation direction;
the first controller acquires information indicating whether or not the second blur-correction part has a function of correcting the blur caused by the motion in the translation direction; and,
when the second blur-correction part has the function of correcting the blur caused by the motion in the translation direction, the first controller performs control so that the first blur-correction part does not correct the blur caused by the motion in the translation direction.

5. The camera body according to claim 4, wherein, when the first blur-correction part does not correct the blur caused by the motion in the translation direction, the first controller commands the lens unit to correct the blur caused by the motion in the translation direction.

6. The camera body according to claim 1,
wherein the first blur-correction part is capable of correcting a blur caused by motion in a translation direction;
the first controller performs determination whether or not the camera body is in a close-up photographing state; and,
based on a result of the determination, the first controller determines whether or not to cause the first blur-correction part to correct the blur caused by the motion in the translation direction.

7. The camera body according to claim 6, wherein, only when the first controller determines that the camera body is in the close-up photographing state, the first controller performs control so that the first blur-correction part corrects the blur caused by the motion in the translation direction.

8. A camera system comprising:
a camera body; and
a lens unit including an optical system for condensing light incident from a subject onto an imaging surface to form an optical image of the subject, the lens unit being detachably mounted on the camera body and capable of communicating with the camera body,
the camera body including:
an imaging part having the imaging surface, for forming an image by converting the light incident from the optical system into an electric signal;
a first blur-detecting part capable of detecting motion of the camera body at least in a pitching, yawing, and rolling directions;
a first blur-correction part including an actuator capable of correcting a blur caused by the motion in the pitching, yawing, and rolling directions based on a result of the detecting by the first blur-detecting part; and
a first controller, capable of communicating with the lens unit, for controlling the first blur-detecting part and the first blur-correction part,
wherein the first controller acquires information indicating whether or not the lens unit includes a second blur-correction part to correct a blur, by moving a lens group, caused by the motion in the pitching and yawing directions; and,
when the lens unit causes the second blur-correction part to operate, the first blur-correction part moves the imaging part by the actuator to correct only a blur caused by the motion in the rolling direction.

9. The camera system according to claim 8,
wherein the lens unit further includes:
a second blur detection unit capable of detecting the motion in the pitching and yawing directions;
the second blur correction unit capable of correcting the blur caused by the motion in the pitching and yawing directions based on a result of the detecting by the second blur detection unit; and
a second controller, capable of communicating with the camera body, for controlling the second blur detection unit and the second blur correction unit, and
the second controller transmits, to the camera body, the information indicating whether or not the lens unit includes the second blur-correction part.

10. A method of correcting a blur of a camera body on which a lens unit is detachably mounted, the lens unit including an optical system to condense light incident from a subject, the camera body including an imaging part to convert the light incident from the optical system into an electrical signal to form an image,
the method comprising the steps of:
acquiring lens information indicating whether or not the lens unit is capable of correcting a blur caused by motion in a pitching and yawing directions;
determining whether or not the lens unit is capable of correcting the blur, by moving a lens group, caused by the motion in the pitching and yawing directions based on the lens information acquired in the step of acquiring the lens information; and
correcting, by rotation of the imaging part of the camera body, only a blur caused by motion in a rolling direction when the lens unit is determined, in the step of determining, to be capable of correcting the blur caused by the motion in the pitching and yawing directions.

* * * * *